(12) United States Patent
Adams

(10) Patent No.: US 8,057,143 B2
(45) Date of Patent: Nov. 15, 2011

(54) TRAILER LOAD SECUREMENT SYSTEM

(75) Inventor: James H. Adams, Jasper, AL (US)

(73) Assignee: Fontaine Trailer Company, Inc., Haleyville, AL (US)

( * ) Notice: Subject to any disclaimer, the term of this patent is extended or adjusted under 35 U.S.C. 154(b) by 425 days.

(21) Appl. No.: 12/197,788

(22) Filed: Aug. 25, 2008

(65) Prior Publication Data

US 2009/0028658 A1    Jan. 29, 2009

Related U.S. Application Data

(63) Continuation-in-part of application No. 11/235,757, filed on Sep. 27, 2005, now Pat. No. 7,571,953.

(60) Provisional application No. 60/616,029, filed on Oct. 5, 2004.

(51) Int. Cl.
   *B60P 7/08*     (2006.01)
   *B62D 33/02*     (2006.01)

(52) U.S. Cl. ........ 410/104; 410/102; 410/106; 410/110; 410/112; 296/184.1; 296/204; 296/40

(58) Field of Classification Search .............. 296/184.1, 296/37.6, 40, 182.1, 193.07, 204, 37.1; 410/102, 410/104–106, 110, 112, 116; 248/499; 24/115 K, 24/265 CD
See application file for complete search history.

(56) References Cited

U.S. PATENT DOCUMENTS

| | | | |
|---|---|---|---|
| 2,735,377 A * | 2/1956 | Elsner | 410/105 |
| 3,422,508 A | 1/1969 | Higuchi | |
| 3,622,114 A * | 11/1971 | McIntire, Jr. | 248/346.02 |
| 3,705,732 A | 12/1972 | Marinelli | |
| 3,774,364 A | 11/1973 | Johnson | |
| 3,909,059 A | 9/1975 | Benninger et al. | |
| 4,020,769 A * | 5/1977 | Keir | 410/96 |
| 4,049,229 A * | 9/1977 | Peisner | 410/11 |
| 4,049,285 A | 9/1977 | Chieger | |
| 4,138,950 A | 2/1979 | Mooney et al. | |
| 4,226,465 A * | 10/1980 | McCullough | 296/184.1 |
| 4,358,134 A | 11/1982 | Scully | |
| 4,484,847 A | 11/1984 | Holmes | |
| 4,626,022 A | 12/1986 | Booher | |
| 4,787,669 A | 11/1988 | Wante | |
| 4,838,605 A | 6/1989 | Abromavage | |
| 4,936,724 A | 6/1990 | Dutton | |
| 4,954,031 A | 9/1990 | Geeck, III | |
| 5,417,453 A | 5/1995 | VanDenberg | |
| 5,474,331 A * | 12/1995 | Booher | 280/789 |
| 5,788,437 A | 8/1998 | Kalis, Jr. | |
| 5,827,023 A | 10/1998 | Stull | |
| 6,174,023 B1 | 1/2001 | Booher | |
| 6,182,411 B1 | 2/2001 | Ganser et al. | |
| 6,283,538 B1 * | 9/2001 | Reitnouer | 296/184.1 |
| 6,439,814 B1 | 8/2002 | Floe | |
| 6,514,021 B2 * | 2/2003 | Delay | 410/90 |
| 6,527,487 B2 * | 3/2003 | Adams | 410/104 |
| 6,626,623 B2 | 9/2003 | DeLay | |
| 6,669,271 B2 | 12/2003 | Booher | |

(Continued)

*Primary Examiner* — Glenn Dayoan
*Assistant Examiner* — Gregory Blankenship
(74) *Attorney, Agent, or Firm* — Angela Holt; Lanier Ford Shaver & Payne, P.C.

(57) ABSTRACT

A trailer includes a floor engageable with a load, the trailer floor comprising a plurality of floor panels. Each floor panel comprises a plurality of tubular portions that are hollow inside to reduce weight. The tubular portions have an upper wall comprising pairs of parallel channels which slideably receive at least one sliding bracket for securing the load to the trailer.

15 Claims, 9 Drawing Sheets

U.S. PATENT DOCUMENTS

| | | | |
|---|---|---|---|
| 6,709,208 B1 | 3/2004 | Lyrstrand et al. | |
| 6,709,209 B2 | 3/2004 | Zhan et al. | |
| 6,712,568 B2 | 3/2004 | Snyder et al. | |
| 6,846,140 B2 | 1/2005 | Anderson et al. | |
| 6,871,904 B2 | 3/2005 | Bhat et al. | |
| 6,918,721 B2 | 7/2005 | Venton-Walters et al. | |
| 6,948,895 B2 | 9/2005 | Buff | |
| 6,960,055 B2 | 11/2005 | Musso et al. | |
| 6,984,095 B2 | 1/2006 | Johnson | |
| 7,070,374 B2 | 7/2006 | Womack et al. | |
| 7,157,377 B2 * | 1/2007 | Garza et al. | 438/694 |
| 7,175,377 B2 | 2/2007 | Womack et al. | |
| 7,571,953 B2 * | 8/2009 | Adams | 296/184.1 |
| 2002/0012576 A1 | 1/2002 | Anderson | |
| 2002/0025237 A1 | 2/2002 | Adams | |
| 2003/0210966 A1 | 11/2003 | Haire | |
| 2004/0007864 A1 | 1/2004 | Adams | |
| 2004/0009049 A1 | 1/2004 | Booher | |
| 2004/0028497 A1 | 2/2004 | Wheatley | |
| 2004/0135398 A1 | 7/2004 | Booher | |
| 2004/0258498 A1 | 12/2004 | Bruns | |
| 2006/0071506 A1 | 4/2006 | Adams | |

\* cited by examiner

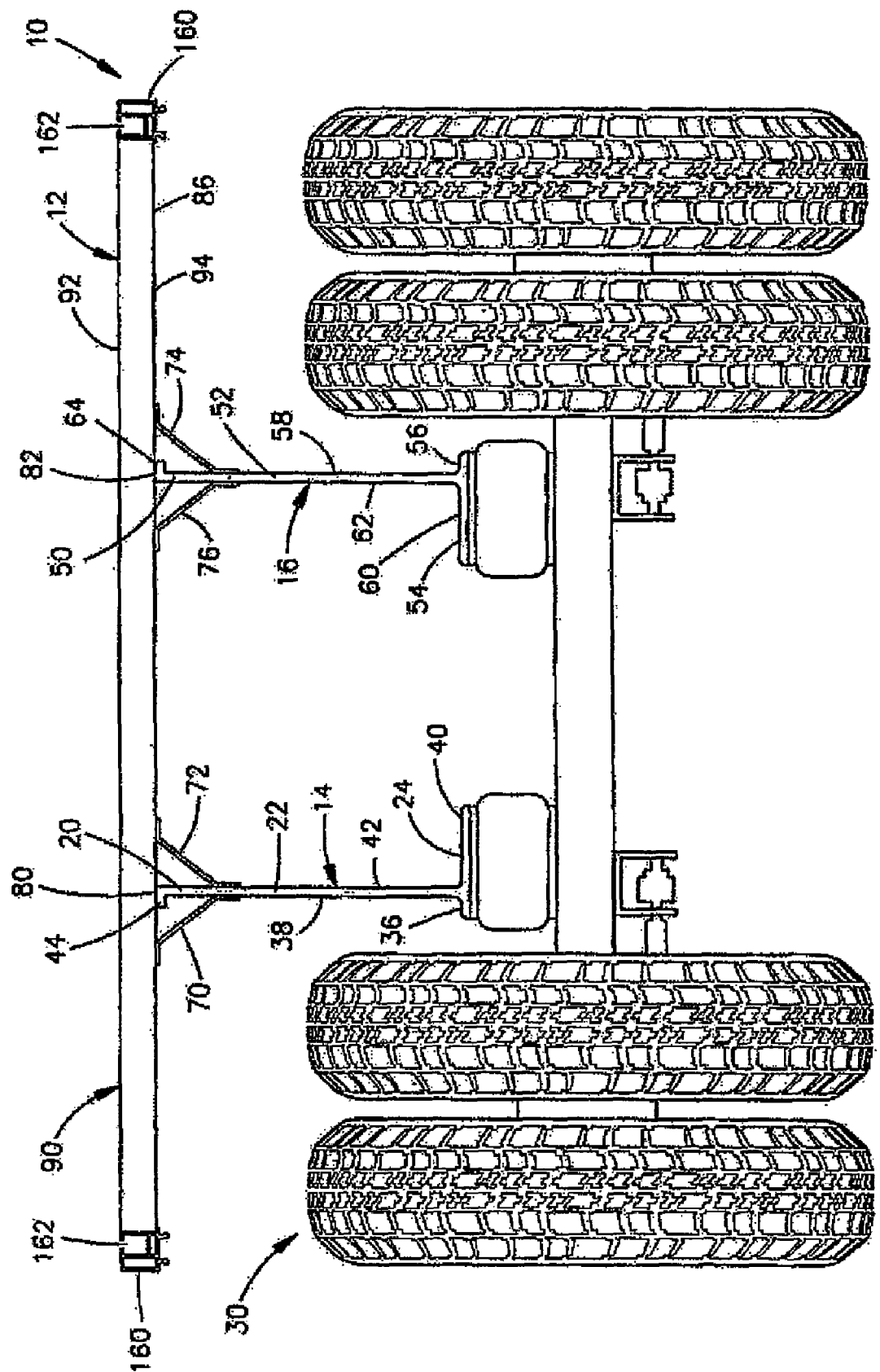

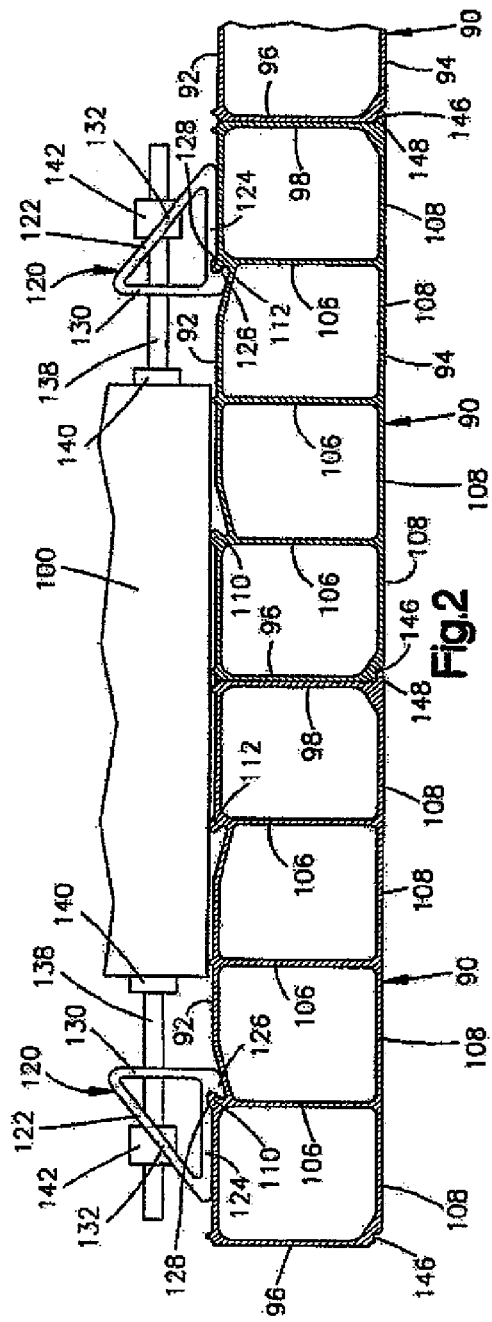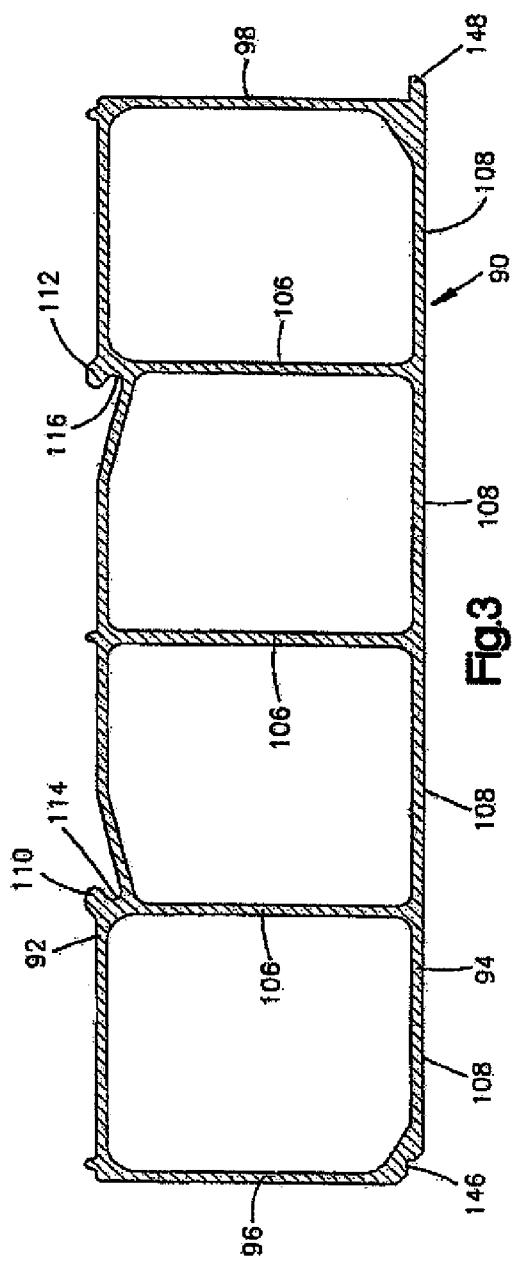

Detail A

Detail B

Detail C

Detail D

TRAILER LOAD SECUREMENT SYSTEM

RELATED APPLICATIONS

This application is a continuation-in-part of and claims priority to U.S. Non-provisional application Ser. No. 11/235,757, filed Sep. 27, 2005, titled "Trailer," which is incorporated herein by reference. This application is related to U.S. Provisional Application Ser. No. 60/616,029, filed Oct. 5, 2004, the subject matter of which is incorporated herein by reference.

FIELD OF THE INVENTION

The present invention is related to a trailer, and more specifically, to a load securement system of a flatbed trailer.

BACKGROUND OF THE INVENTION

A trailer, such as a flatbed trailer, includes a pair of longitudinally extending I-beams that extend the length of the bed. Each I-beam includes an upper flange, a lower flange extending parallel to the upper flange, and a web interconnecting the upper and lower flanges. A suspension system is connected to the lower flange. Cross members extend through the webs and are connected to the webs. Longitudinally extending floor members are connected to upper surfaces of the cross members. The floor members extend between the I-beams so that a load may engage upper surfaces of the I-beams and the floor members.

Traditionally, at least one of the floor members is made of wood for securing a payload to the trailer. The traditional method of securing a trailer load to the trailer is by nailing fasteners to the wood floor members.

SUMMARY OF THE INVENTION

A trailer includes a floor engageable with a load, the trailer floor comprising a plurality of floor panels. Each floor panel comprises a plurality of tubular portions that are hollow inside to reduce weight. The tubular portions have an upper wall comprising pairs of parallel channels which slideably receive at least one sliding bracket for securing the load to the trailer.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed

BRIEF DESCRIPTION OF THE DRAWINGS

The disclosure can be better understood with reference to the following drawings. The elements of the drawings are not necessarily to scale, emphasis instead being placed upon clearly illustrating the principles of the disclosure. Furthermore, like reference numerals designate corresponding parts throughout the several views.

The foregoing and other features of the present invention will become apparent to those skilled in the art to which the present invention relates upon reading the following description with reference to the accompanying drawings, in which:

FIG. 1 is a schematic rear view of an exemplary embodiment of a trailer in accordance with the present disclosure.

FIG. 2 is a schematic sectional view of the floor of the trailer of FIG. 1 showing a load secured on the floor.

FIG. 3 is an enlarged sectional view of a portion of the floor of FIG. 2.

FIG. 6b is an enlarged detail view taken along detail view "A" of FIG. 6a.

FIG. 6c is an enlarged detail view taken along detail view "B" of FIG. 6a.

FIG. 6d is an alternative embodiment of the raised tracks as depicted in FIG. 6a.

FIG. 7b is an enlarged detail view taken along detail view "D" of FIG. 7a.

DETAILED DESCRIPTION

Figure 4:
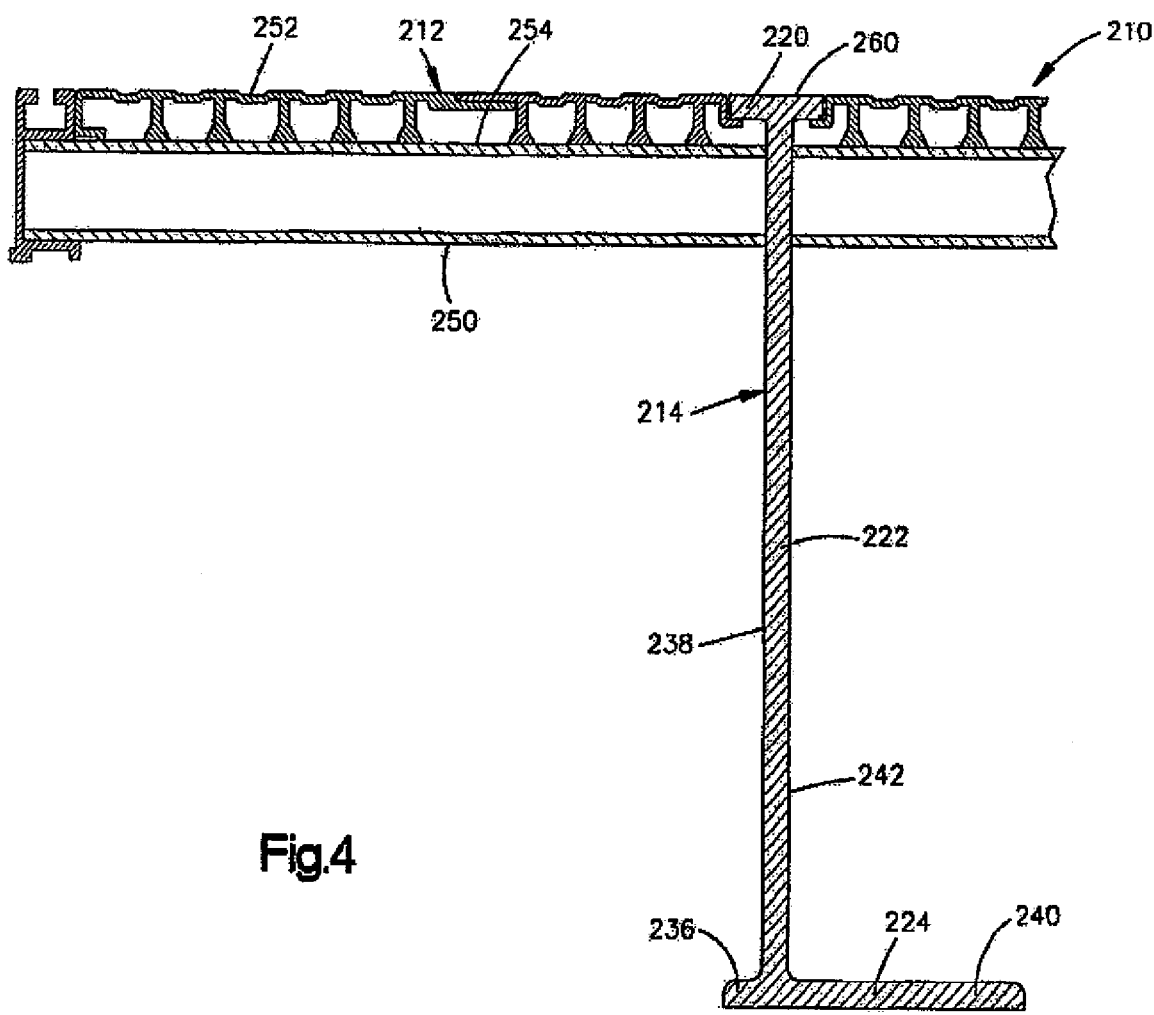
FIG. 4 is a schematic sectional view of a portion of a trailer in accordance with another embodiment of the present disclosure.

The present invention is directed to a trailer, and more specifically, to a load securement system for a flatbed trailer.

As representative of a first embodiment of the present invention, FIG. 1 schematically illustrates a flatbed trailer 10. The trailer 10 includes a floor 12 and first and second longitudinally extending support members 14 and 16 for the floor. The support members 14 and 16 may be manufactured by extrusion. The support members 14 and 16 extend generally parallel to each other along the length of the trailer 10.

The support member 14 includes an upper portion 20 connected to the floor 12. A web 22 extends downwardly, as viewed in FIG. 1, and transverse to the floor 12. The web 22 may extend generally perpendicular to the floor 12. The web 22 extends between the upper portion 20 and a lower flange or lower portion 24. The web 22 may include a tapered lower portion connected to the lower flange 24 for added reinforcement.

The lower flange or lower portion 24 extends transverse to the web 22. The lower flange 24 may extend generally perpendicular to the web 22 and generally parallel to the floor 12. The web 22 interconnects the upper portion 20 and the lower flange 24. A suspension system 30, which is schematically shown in FIG. 1, is connected with the lower flange 24.

The lower flange 24 includes a first portion 36 extending from a first side 38 of the web 22 in a direction away from the support member 16. The first portion 36 extends from the web 22 a first distance. The first portion 36 may extend any desired distance from the web 22. It is contemplated that the first portion 36 may extend approximately two to three inches from the web 52.

The lower flange 24 includes a second portion 40 extending from a second opposite side 42 of the web 22 in a direction toward the support member 16. The second portion 40 of the lower flange 24 extends from the web 22 a second distance larger than the first distance. The second portion 40 may extend any desired distance from the web 52. It is contemplated that the second portion 40 may extend approximately six to ten inches from the web 52.

The upper portion 20 of the support member 14 may include a small upper flange 44 extending from the first side 38 of the web 22 in a direction away from the support member 16. The flange 44 extends transverse to the web 22. The flange 44 may extend generally parallel to the lower flange 24 and generally perpendicular to the web 22. It is contemplated that the upper flange 44 may include a second portion extending from the second side 42 of the web 22.

The support member 16 includes an upper portion 50 connected to the floor 12. A web 52 extends downwardly, as viewed in FIG. 1, and transverse to the floor 12. The web 52 may extend generally perpendicular to the floor 12 and generally parallel to the web 22 of the support member 14. The web 52 extends between the upper portion 50 and a lower flange or lower portion 54. The web 52 may include a tapered lower portion connected to the lower flange 54 for added reinforcement.

The lower flange or lower portion 54 extends transverse to the web 52. The lower flange 54 may extend generally perpendicular to the web 52 and generally parallel to the floor 12. The web 52 interconnects the upper portion 50 and the lower flange 54. The suspension system 30, which is schematically shown in FIG. 1, is connected with the lower flange 54.

The lower flange 54 includes a first portion 56 extending from a first side 58 of the web 52 in a direction away from the support member 14. The first portion 56 extends from the web 52 a first distance. The first portion 56 may extend any desired distance from the web 52. It is contemplated that the first portion 56 may extend approximately two to three inches from the web 52.

The lower flange 54 includes a second portion 60 extending from a second opposite side 62 of the web 52 in a direction toward the support member 14. The second portion 60 of the lower flange 54 extends from the web 52 a second distance larger than the first distance. The second portion 60 may extend any desired distance from the web 52. it is contemplated that the second portion 60 may extend approximately six to ten inches from the web 52.

The upper portion 50 of the support member 16 may include a small upper flange 64 extending from the first side 58 of the web 52 in a direction away from the support member 14. The flange 64 extends transverse to the web 52. The flange may extend generally parallel to the lower flange 54 and generally perpendicular to the web 52. It is contemplated that the upper flange 64 may include a second portion extending from the second side 62 of the web 52.

A first bracket 70 is connected to the floor 12 and the first side 38 of the web 22 of the support member 14. A second bracket 72 is connected to the floor 12 and the second side 42 of the web 22 of the support member 14. A third bracket 74 is connected to the floor 12 and the first side 58 of the web 52 of the support member 16. A fourth bracket 76 is connected to the floor 12 and the second side 62 of the web 52 of the support member 16. The brackets 70, 72, 74 and 76 may be connected to the floor 12 and the support members 14, 16 in any desired manner, such as welding. It is contemplated that any number of brackets may be connected to the floor and the support members 14 and 16 along the longitudinal length of the support member. It is also contemplated that brackets may be connected to only one side of each of the support members 14 and 16.

The floor 12 is connected to an upper surface 80 of the upper portion 20 of the first support member 14 and the upper surface 82 of the upper portion 50 of the second support member 16. A lower surface 86 of the floor 12 engages the upper surfaces 80 and 82 of the support members 14 and 16. The lower surface 86 of the floor 12 also engages the brackets 70, 72, 74 and 76. The floor 12 may be connected to the upper surfaces 80 and 82 of the support members 14 and 16 and the brackets 70, 72, 74, and 76 in any desired manner, such as welding.

The floor 12 (FIGS. 2 and 3) may include a plurality of floor sections 90 connected to each other. The floor 12 may include any desired number of floor sections 90. The floor sections 90 may be connected to each other in any desired manner, such as welding. The floor sections 90 may be made in any desired manner, such as extrusion. The floor sections 90 may be formed from aluminum, or other suitably strong material, such as steel or other metal, or composite material.

Each floor section 90 is identical; accordingly, only one floor section 90 will be described in detail. The floor section 90 (FIGS. 2 and 3) includes an upper wall or portion 92 and a lower wall or portion 94. Side walls portions 96 and 98 extend generally perpendicular to the upper and lower walls 92 and 94. A load 100, schematically shown in FIG. 2, may engage the upper wall 92. The lower wall 94 (FIG. 1) engages the support members 14 and 16. The side walls 96 and 98 (FIG. 2) engages side walls of adjacent floor sections 90.

A plurality of partitioning walls 106 (FIGS. 2 and 3) extend generally perpendicular to the upper and lower walls 92 and 94 and generally parallel to the side walls 96 and 98. The partitioning walls 106 define a plurality of tubular portions 108 extending transverse to longitudinal axes of the support members 14 and 16. Although three partitioning walls 106 defining four tubular portions 108 shown in FIGS. 2 and 3, it is contemplated that the floor section 90 may have any desired number of partitioning walls 106 defining any desired number of tubular portions 108.

The upper wall 92 (FIGS. 2 and 3) includes a pair of hook portions 110 and 112 extending upward, as viewed in FIGS. 2 and 3, away from the bottom wall 94 and the support members 14 and 16. The hook portion 110 (FIG. 3) defines a recess 114 facing toward the hook portion 112 and a front of the trailer. The hook portion 112 defines a recess 116 facing toward the hook portion 114 and a rear of the trailer.

The hook portions 110 and 112 engage supports 120 (FIG. 2) for helping to secure the load to the floor 12. The supports 120 are identical; accordingly only one support 120 will be described in detail. The support 120 includes a base or bracket 122. The bracket 122 has a lower wall 124 with a hook portion 126 defining a recess 128. The hook portion 126 of the bracket 122 extends into one of the recesses 114 or 116 in the floor 12 and one of the hook portions 110 or 112 extends into the recess 128 in the bracket 122 to hold the support 120 in position on the floor 12.

The bracket 122 includes a second wall 130 extending generally perpendicular to the lower wall 124. A third wall 132 extends between the lower wall 124 and the second wall 130 so that the bracket 122 has a triangular cross-section. The second and third walls 130 and 132 have openings (not shown) through which a lock bar 138 extends. A block 140 for engaging the load 100 is connected to an end of the lock bar 138.

The lock bar 138 also extends through a locking mechanism 142 connected to the third wall 132. The lock bar 138 is movable relative to the locking mechanism 142 and the bracket 122 to position the block 140 in engagement with the load 100. The locking mechanism 142 locks the lock bar 138 and the block 140 in position relative to the load 100 and the bracket 122. The locking mechanism 142 may have any desired construction that permits the lock bar 138 to be positioned relative to the bracket 122 and the load 100 and can lock the lock bar in a desired position. Accordingly, supports 120 may be easily placed on opposite sides of the load 100 to help secure the load to the floor 12. Although two supports are shown in FIG. 2, it is contemplated that any number of supports 120 could be used to help secure the load.

The lower wall 94 (FIGS. 2 and 3) of the floor section 90 includes a notch or recess 146 where the lower wall intersects the side wall 96 in a lower left corner of the floor section, as viewed in FIGS. 2 and 3. A tab or flange 148 extends from the lower wall 94 where the lower wall intersects the side wall 98 at a lower right corner of the floor section 90, as viewed in FIGS. 2 and 3. The tab or flange 148 (FIG. 2) extends into the recess 146 of an adjacent floor section 90 of the floor 12. The tab or flange 148 may be connected to the adjacent floor section 90 in any desired manner, such as welding.

The floor 12 (FIG. 1) may include a pair of longitudinally extending side rails 160. Each of the rails 160 may include a slot 162 for helping secure the load 100 to the floor 12. The side rails 160 may have any desired shape.

As representative of a second embodiment of the present invention, FIG. 4 schematically illustrates a portion of a flatbed trailer 210. The trailer 210 includes a floor 212 and a first longitudinally extending support member 214 and a second longitudinally extending support member (not shown) for the floor. The first support member 214 extends generally parallel to the second support member along the length of the trailer 210. The first support member 214 and the second support member may be manufactured by extrusion.

The first support member 214 is generally similar to the second support member, accordingly, only the first support member 214 will be described in detail. The support member 214 includes an upper portion or upper flange 220. A web 222 extends downwardly, as viewed in FIG. 4, and transverse to the upper flange 220 and the floor 212. The web 222 may extend generally perpendicular to the floor 212 and the upper flange 220. The web 222 extends between the upper flange 220 and a lower flange or lower portion 224. The web 222 may include a tapered lower portion connected to the lower flange 224 for added reinforcement.

The lower flange or lower portion 224 extends transverse to the web 222. The lower flange 224 may extend generally perpendicular to the web 222 and generally parallel to the upper flange 220. A suspension system (not shown) is connected with the lower flange 224.

The lower flange 224 includes a first portion 236 extending from a first side 238 of the web 222 in a direction away from the second support member. The first portion 236 extends from the web 222 a first distance. The first portion 236 may extend any desired distance from the web 222. It is contemplated that the first portion 236 may extend approximately two to three inches from the web 222.

The lower flange 224 includes a second portion 240 extending from a second opposite side 242 of the web 222 in a direction toward the second support member. The second portion 240 of the lower flange 224 extends from the web 222 a second distance larger than the first distance. The second portion 240 may extend any desired distance from the web 222. It is contemplated that the second portion 240 may extend approximately six to ten inches from the web 222.

A plurality of cross members 250, one of which is shown in FIG. 4, extends through the web 222 of the first support member 214 and a web of the second support member and are connected to the webs. The cross members 250 may be connected to the web 222 and the web of the second support member in any desired manner, such as welding. Longitudinally extending floor members 252 are connected to upper surfaces 254 of the cross members 250. The floor members 252 extend between the first support member 214 and the second support member so that an upper surface 260 of the upper flange 220 of the support member 214 and an upper surface of the second support member may engage a load.

Although the floor 12 is shown with the support members 14 and 16, it is contemplated that the floor 12 could be used with the support member 214 or any desired support member. Furthermore, it is contemplated that the floor 12 may not include the hook portions 110 and 112. It is also contemplated that the hook portions 110 and 112 may be used on any desired floor for helping secure a load to a trailer.

Figure 5:
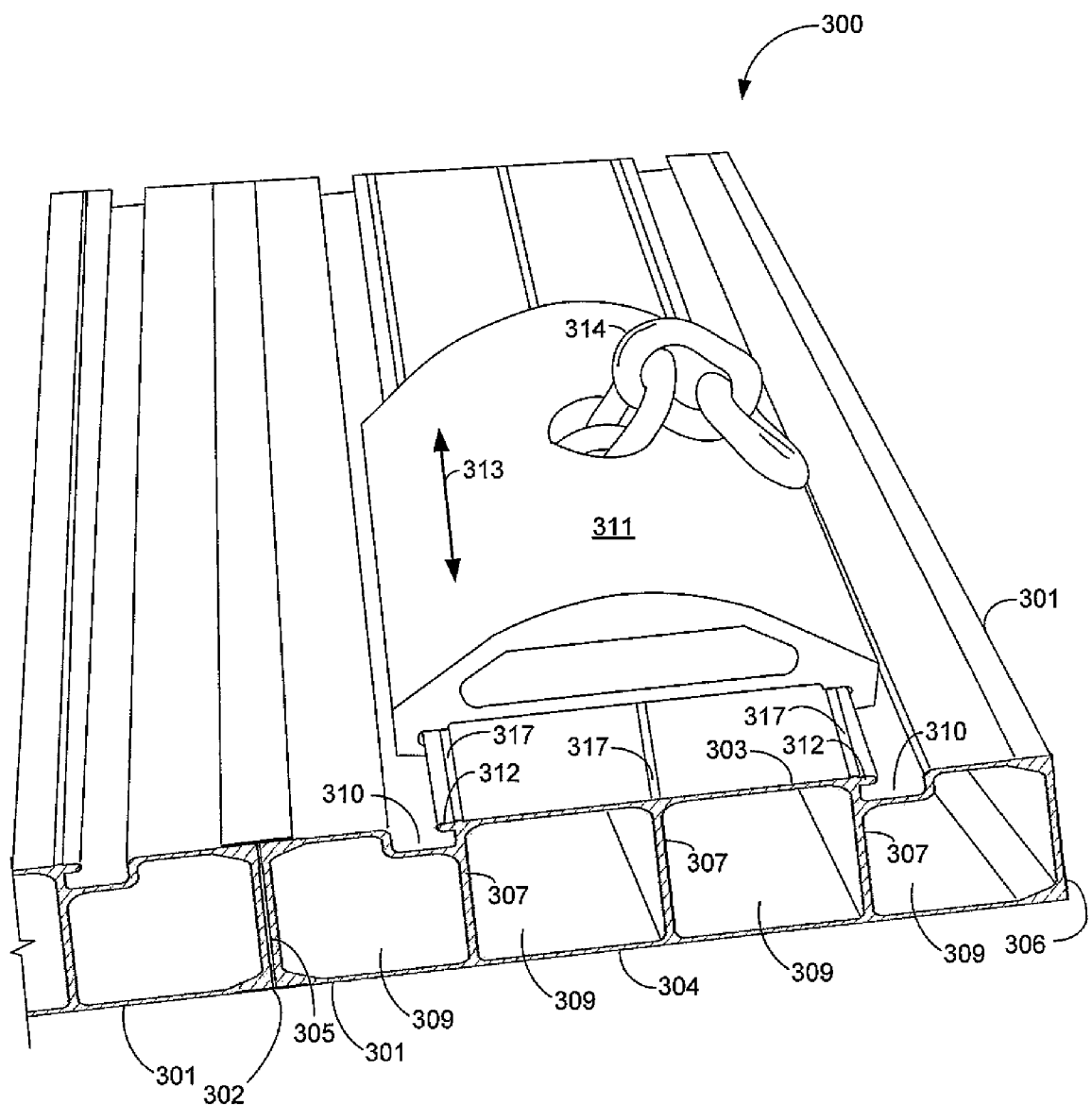
FIG. 5 is a perspective view of a floor panel with a sliding bracket according to an embodiment of the present disclosure.
Figure 6A:
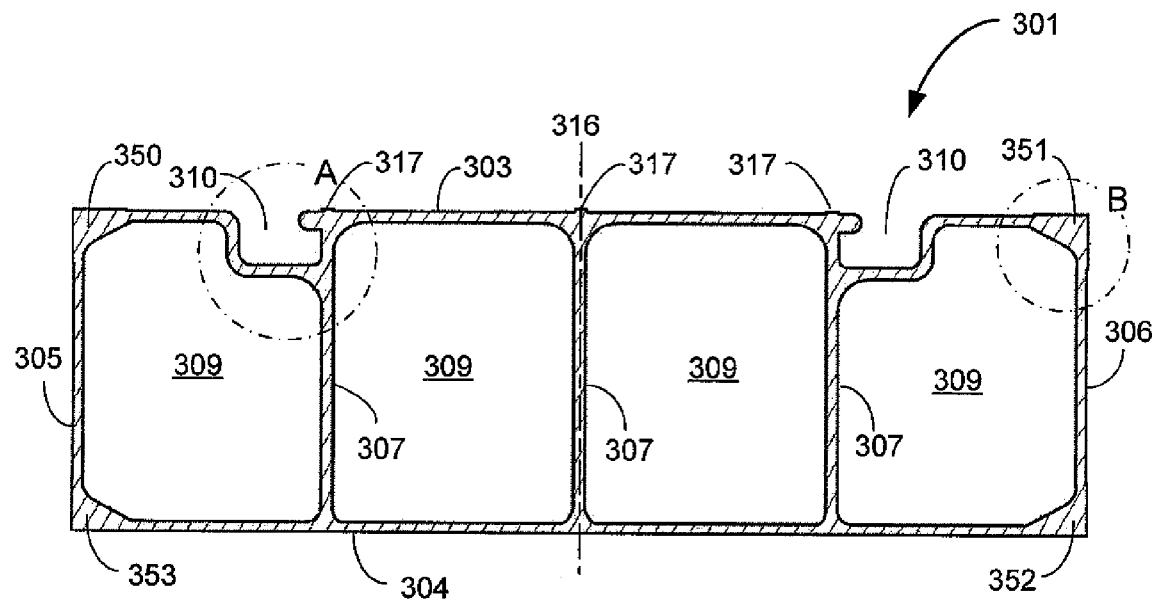
FIG. 6a is a cross sectional view of the floor panel of FIG. 5.

FIGS. 5 and 6a illustrate another embodiment of a trailer floor 300. The floor 300 is comprised of a plurality of floor panels 301 connected to each other. The floor 300 may include any desired number of floor panels 301. The floor panels may be connected to each other in any desired manner, and in the illustrated embodiment is shown connected by welding at the joint 302 between the adjacent panels 301. The floor panels 301 may be made in any desired manner, such as extrusion. The floor panels 301 may be formed from aluminum or other suitable material, such as steel or other metal, or composite material Each floor panel 301 is identical; accordingly, only one floor panel 301 will be described in detail. The floor panel 301 includes an upper wall 303 and a lower wall 304. Side walls 305 and 306 extend generally perpendicular to the upper and lower walls 303 and 304. A load (not shown) may engage the upper wall 303. The lower wall 304 engages the support members 14 and 16 (FIG. 1). The side walls 305 and 306 engage side walls of adjacent floor sections 301.

A plurality of partitioning walls 307 (FIG. 6a) extend generally perpendicular to the upper and lower walls 303 and 304 and generally parallel to the side walls 305 and 306. The partitioning walls 307 define a plurality of tubular portions 309 integral to panel 301 and extending longitudinally down the panel 301. Although three (3) partitioning walls 307 defining four (4) tubular portions 309 are shown in FIGS. 5 and 6a, it is contemplated that the floor section 301 may have any desired number of partitioning walls 307 defining any desired number of tubular portions 309.

The upper wall 303 includes a pair of recessed channels 310 running generally parallel to the longitudinal axis of the floor panel 301, as shown in FIG. 5. The pair of channels 310 receives one or more sliding brackets 311. The sliding brackets 311 are slideably retained in the channels 310 by protrusions 312 that extend from the upper wall 303 into the channels 310. The sliding brackets 311 may slide within the channels 310 in a direction longitudinal to the floor panels 301, as indicated by directional arrow 313.

At the ends (not shown) of each floor panel 301, there may be no protrusions 312, to allow for installation of the sliding brackets 311 into the channels 310. For example, in one embodiment (not shown), the last six (6) inches of the pair of channels 310 does not have protrusions 312, enabling the sliding bracket to be "dropped" into the channel and slid in the direction of directional arrow 313 until the protrusions 312 engage with the sliding bracket 311 to retain the bracket 311.

A securement device 314, such as a chain illustrated in FIG. 5, extends from the sliding bracket 311 and attaches to chains or straps (not shown) that secure the load (not shown).

Raised strips 317 in the upper wall 303 comprise thin raised strips running longitudinally down each floor panel 301. The raised strips 317 may provide traction for the load (not shown), as further discussed herein. The raised strips 317 also provide load-bearing surfaces directly above the partitioning walls 307, to increase the effective strength of the floor panel 301. In one embodiment, the raised strips 317 are 0.095" wide and are raised 0.020 above the surface of the upper wall, though other dimensions could be used in other embodiments.

Figure 6B:
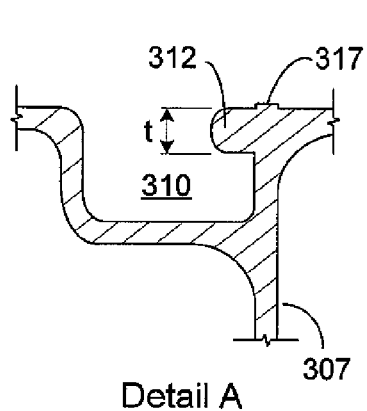

FIG. 6a is an enlarged cross-sectional view of a floor panel 301. In this embodiment, the floor panel 301 is symmetrical and mirror-imaged about a plane running longitudinally through its vertical axis, illustrated in two-dimensional representation as centerline 316. The protrusions 312 extend outwardly from the centerline 316 into the channels 310, thereby forming a generally L-shaped cavity. FIG. 6b ("Detail A," from FIG. 6a) is an enlarged cross-sectional view of the channel 310 showing the protrusion 312 and the raised strips 317.

The protrusion 312 is generally rounded on its outer edge and in one embodiment has a thickness "t" of 0.188 and a radius of 0.094. In one embodiment, the channel 310 is 0.75 wide and approximately ½" deep, and the protrusion 312 protrudes into the channel approximately 0.2 inches. As one with skill in the art knows, other dimensions may be utilized for the protrusions 312 and channel 310. The channel 310 is sized to receive the sliding bracket 311, and the protrusions are sized to slideably retain the sliding bracket 311. Further, in one embodiment, the floor panel 310 is 3.125 inches thick by 9.749 inches wide; however, other dimensions are possible in other embodiments.

The partitioning walls 307 provide strength to the floor panels 301, but the walls 307 are generally thin (0.095 wide in one embodiment). Therefore, most of the panel 301 interior is hollow. The strength lies thus in the "honeycomb" effect of the tubular portions 309, which enables a lightweight but strong trailer floor.

The upper wall, the lower wall 304, and the sidewalls 305 and 306 are also generally thin (0.095 in one embodiment). The floor panel 301 moreover comprises four (4) outer corners: upper left corner 350, where sidewall 305 joins top wall 303; upper right corner 351, where sidewall 306 joins with top wall 303; lower right corner 352, where sidewall 306 joins with lower wall 304; and lower left corner 353, where sidewall 305 joins with lower wall 304. In one embodiment, the material in the corner regions is generally thicker than the walls 303, 304, 305, and 306, as illustrated in FIG. 6a, to strengthen the floor panel 301.

Figure 6C:
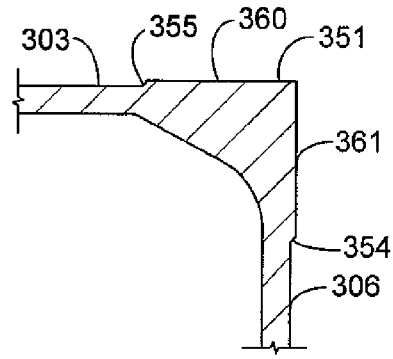

Further, as shown in FIG. 6c ("Detail B," from FIG. 6a) the side wall 306 is recessed from a vertical surface 361 of the upper right corner 351, i.e., the side wall 306 "steps down" from the vertical surface 361 at step 354. Although not illustrated, each of the corners 350, 352 and 353 are similarly disposed, and the side wall 305 is also similarly recessed. The purpose of this recession is to ensure that the corners of adjacent panels are flush when welding, and that side walls 305 and 306 cannot bow out such that a protruding side wall prevents the corners from meeting. The sidewalls 305 and 306 are recessed by 0.020 in one embodiment, though other dimensions could be used in other embodiments.

Referring to FIG. 6c, the upper wall 303 "steps up" to the horizontal surface 360 in the upper right corner 351 at step 355. The raised area in the corner 351 provides a thicker surface for the weld between adjacent floor panels 301. The horizontal surface 360 is raised above the upper wall 303 by 0.020 in one embodiment, though other dimensions could be used. The upper left corner 351 is similarly raised from the upper wall 303.

As shown in FIG. 6a, the raised strips 317 are located generally directly above the partitioning walls 307. The purpose of this configuration is to concentrate the weight of the load (not shown) on the strongest areas of the floor panel 301.

Figure 6D:
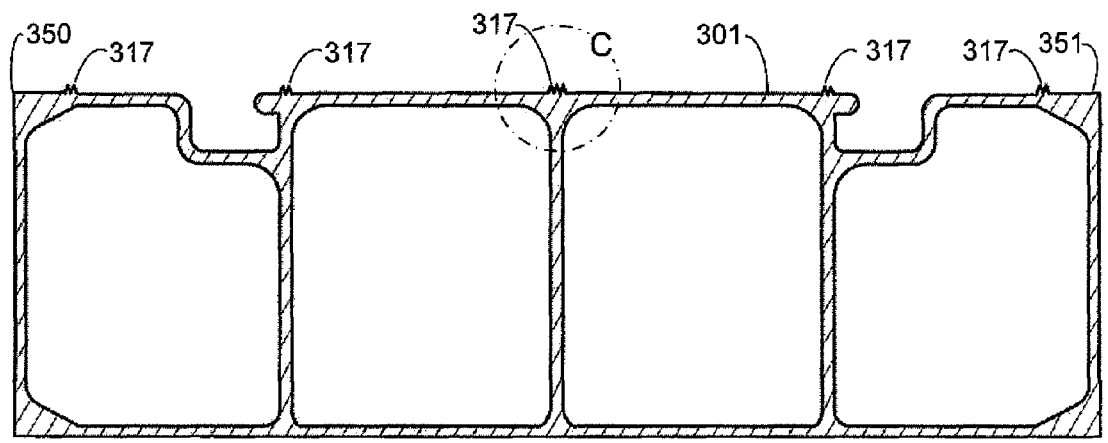
Figure 6E:
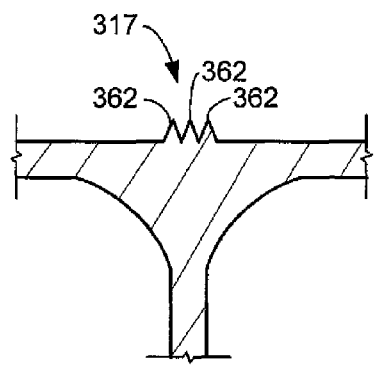
FIG. 6e is an enlarged detail view taken along detail view "C" of FIG. 6d.

FIGS. 6d and 6e illustrate an alternative embodiment of the floor panel 301 in which the raised strips 317 are comprised of a plurality of pointed protrusions 362 instead of the plain raised strips illustrated in FIGS. 6a and 6b. Although three (3) pointed protrusions 362 are illustrated in FIG. 6e, more or fewer protrusions 362 could be employed in other embodiments. The pointed protrusions 362 offer the advantage of providing traction to the floor panels 301. In addition to the traction provided by the pointed protrusions 362 in the raised strips 317, the raised strips may also be serrated (for example, a knurler may be used on the surface of the raised strips 317). The serration (not shown) adds further traction to the floor panels 301.

As shown in FIG. 6d, raised strips 317 may also be employed near the upper left and upper right corners, 350 and 351 respectively, for added traction.

Figure 7A:
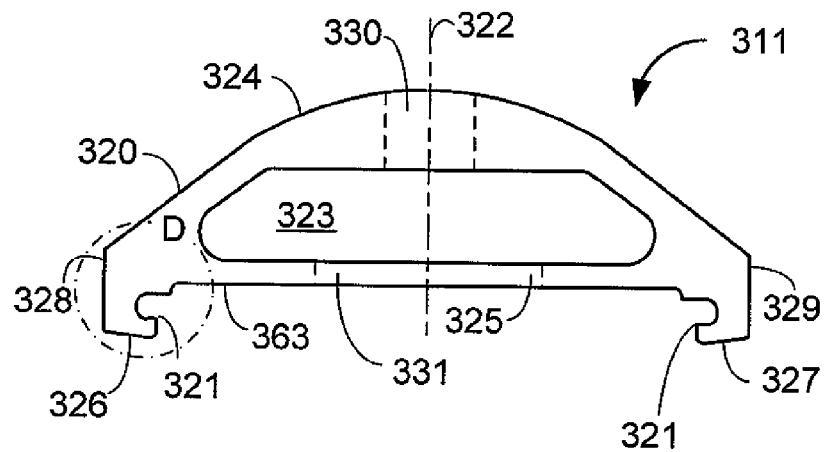
FIG. 7a is an end view of the body of the sliding bracket of FIG. 5.

FIG. 7a is an end view of the sliding bracket 311. The bracket comprises a one-piece body 320, which may be formed by extrusion or other suitable process. Extruded aluminum is used for the body 320 in one embodiment, but other materials would also be suitable. The central portion 323 of the body 320 may be hollow as illustrated, to reduce weight and material and also to enclose the securement device 314 (FIG. 5) as discussed further herein.

In the illustrated embodiment, the body 320 is symmetrical and mirror-imaged about a plane running longitudinally through its vertical axis, illustrated in the two-dimensional representation of FIG. 7a as centerline 322. The body 320 is comprised of a curved top portion 324, middle support web 325, and left and right lower edges 326 and 327, respectively. Left and right lower edges 326 and 327 each comprise a concavely curved hook portion 321 that extends down the body 320, (i.e., in the direction of movement of the sliding bracket 311 (See FIG. 5), as indicated by directional arrow 313 (FIG. 5).

Figure 8:
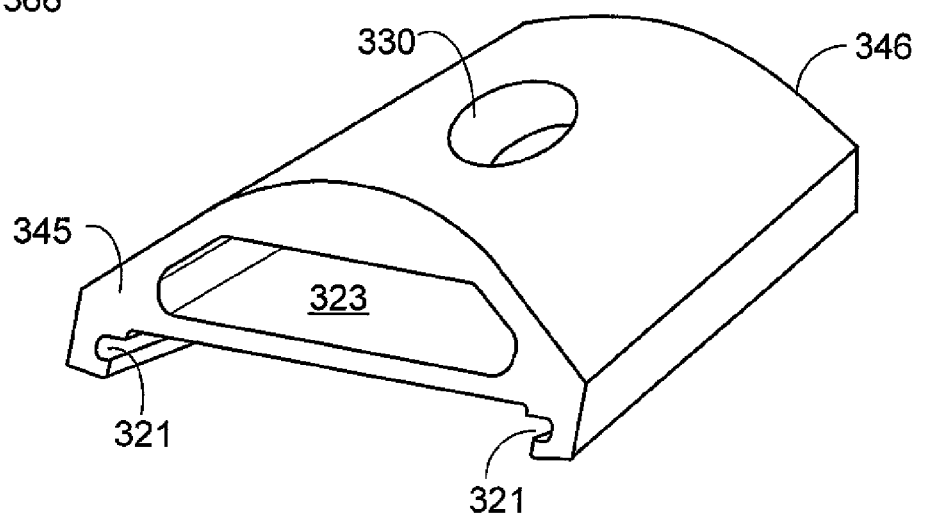
FIG. 8 is a front perspective view of the body of the sliding bracket of FIG. 5.

A top opening 330 extends between the top portion 324 of the body 320 and the central portion 323 of the body 320. The top opening 330, which in the illustrated embodiment is a cylindrical opening, retains the securement device 314 (FIG. 5). The top opening 330 is further illustrated in FIG. 8, a perspective view of the sliding bracket 311.

A middle support web 325 provides structural support for the body 320, and extends horizontally between a right side 328 and a left side 329 of the body 320. The middle support web 325 comprises a lower surface 363. The middle support web 325 further comprises access opening 331, which in the illustrated embodiment is a cylindrical opening. The access opening 331 permits access to the central portion 323 of the body 320 for installation of the securement device 314 (FIG. 5), as further discussed below.

Figure 7B:
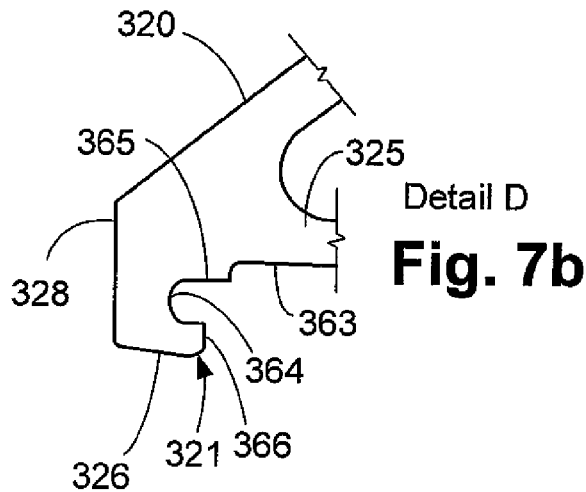

As shown in the enlarged view of FIG. 7b ("Detail D" from FIG. 7a), in one embodiment the hook portion 321 is comprised of generally C-shaped concavity 364 with a protruding lower lip 366. A ceiling surface 365 comprises the top portion of the "C" in the C-shaped concavity 365 and extends beyond the protruding lower lip 366. The lower surface 363 of the middle support web 325 is raised above the ceiling surface 365. The lower surface 363 is raised in this manner in order that the lower surface 363 remain clear of the raised track 317a (FIG. 9) between the channels 310 (FIG. 9) when the sliding bracket 311 is installed onto the floor panels 301.

The hook portion 321 illustrated is a C-shaped concavity 364 described herein so that it engages with the protrusion 312 (FIG. 5) on the floor panels 301 (FIG. 5). As would be contemplated by one of skill in the art, however, the shape of the concavity 364 and protrusion 312 could be modified somewhat without departing from the scope of the present invention, provided that the sliding bracket 311 be slideably engageable within the channels 310 of the floor panels 301 in the general manner described herein.

Figure 9:
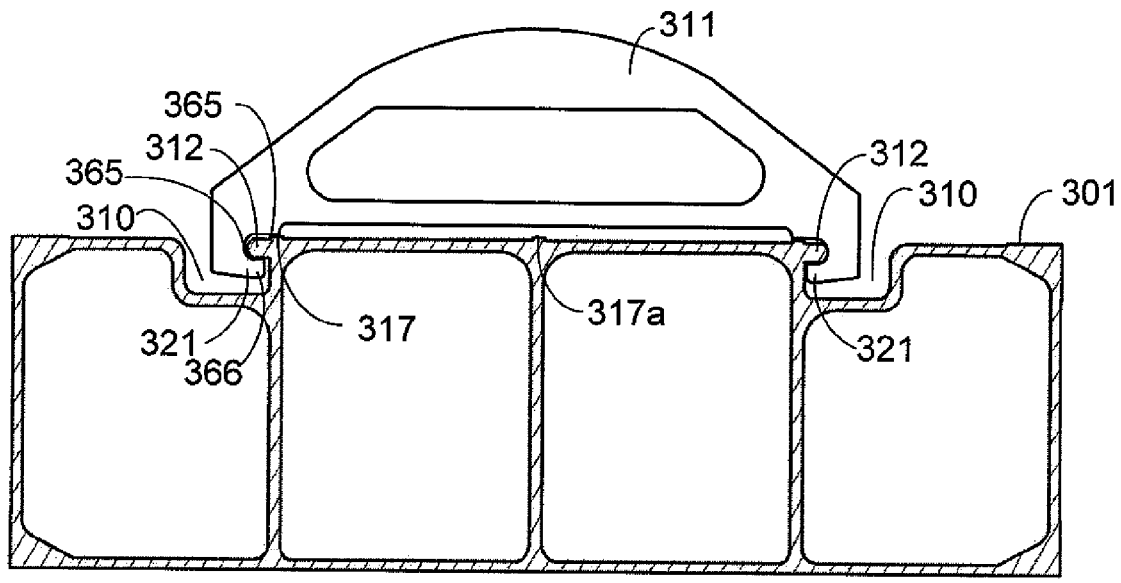
FIG. 9 is an enlarged cross sectional view of the floor panel of FIG. 5 showing an end view of the sliding bracket of FIG. 5 installed in the floor panel.

As shown in FIG. 9, the hook portions 321 of the sliding bracket 311 engage with the protrusions 312 on the floor panel 301 to retain the sliding bracket 311 within the channels 310. In this regard, the protrusions 312 on the sliding bracket 311 are partially enclosed by the C-shaped concavity 365 of the hook portions 321. The ceiling surface 365 of the sliding bracket 311 slideably rests on the raised tracks 317 as illustrated. This configuration minimizes the sliding contact area between the sliding bracket 311 and the floor panel 301, so that the sliding contact area is limited to the raised tracks 317 and small portions of the ceiling surface 365. Once the bracket 311 is installed in the channel 310, the bracket 311 may slide longitudinally down the length of the floor panel 301 until it is in the desired position for securing a load (not shown).

Figure 10:
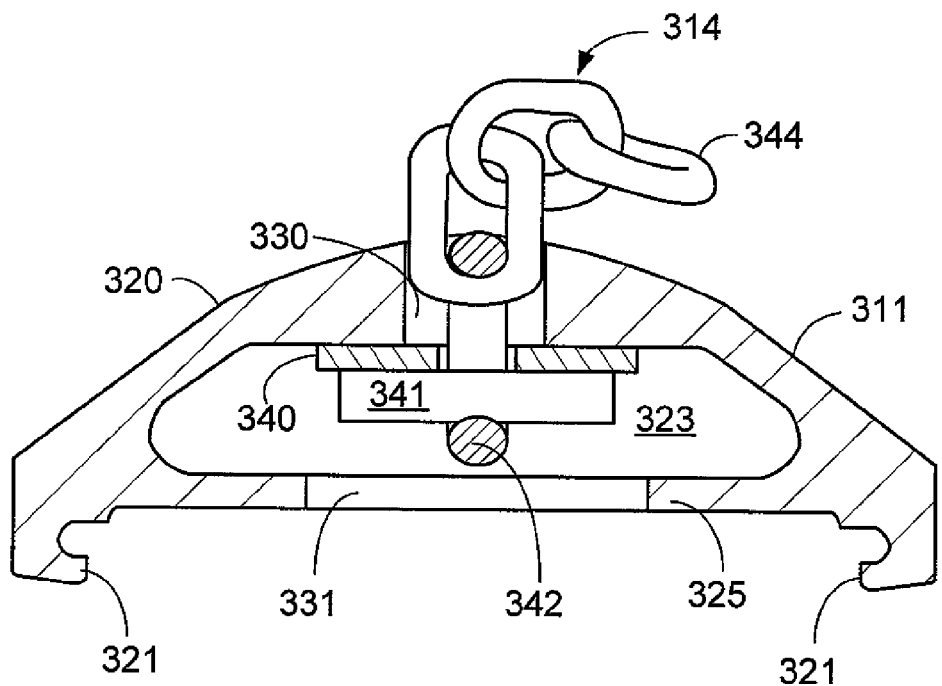
FIG. 10 is a cross sectional view of the sliding bracket of FIG. 5.

FIG. 10 is a cross-sectional view of the sliding bracket 311, further illustrating one embodiment of the securement device 314. The securement device 314 comprises a short length of chain 344 that passes through the top opening 330 and into the central portion 323 of the body 320. A lowermost chain link 342 is passed through a washer 340, and then a cross bar 341 is passed through the central opening (not shown) of the lowermost chain link 342. The washer 340 is secured to the cross bar 341 by welding or some other suitable securement method, and the chain 344 is securely fixed to the washer 340/cross bar 341 combination.

The washer 340 may be a standard washer with an oblong-shaped hole (not shown) sized for receiving the lowermost chain link 342. The cross bar may be a solid cylindrical piece of material, for example, aluminum, suitable for passing through the lowermost chain link 342 and for being welded to the washer 340.

The access opening 331 provides access for the connection of the chain 344 to the washer 340 and cross bar 341. After the securement device 314 is installed into the sliding bracket 311, a plug (not shown) may be secured in the access opening 331. The plug may be a simple plastic or rubber plug, or any suitable plug known by one of skill in the art.

Note that the washer 340 is not fixedly secured to the body 320 of the sliding bracket 311 and the securement device 314 is thus not fixedly secured to the sliding bracket 311. Rather, the washer 340 is restrained within the central portion 323 of the body 320 by tension in the chain 344 when secured to a load (not shown). The securement device 314 may be removed from the sliding bracket 311 when the bracket 311 is not in use by removing the bracket 311 from the floor panel 301 and removing the securement device 314 from the bracket 311 through the access opening 331.

Figure 11:
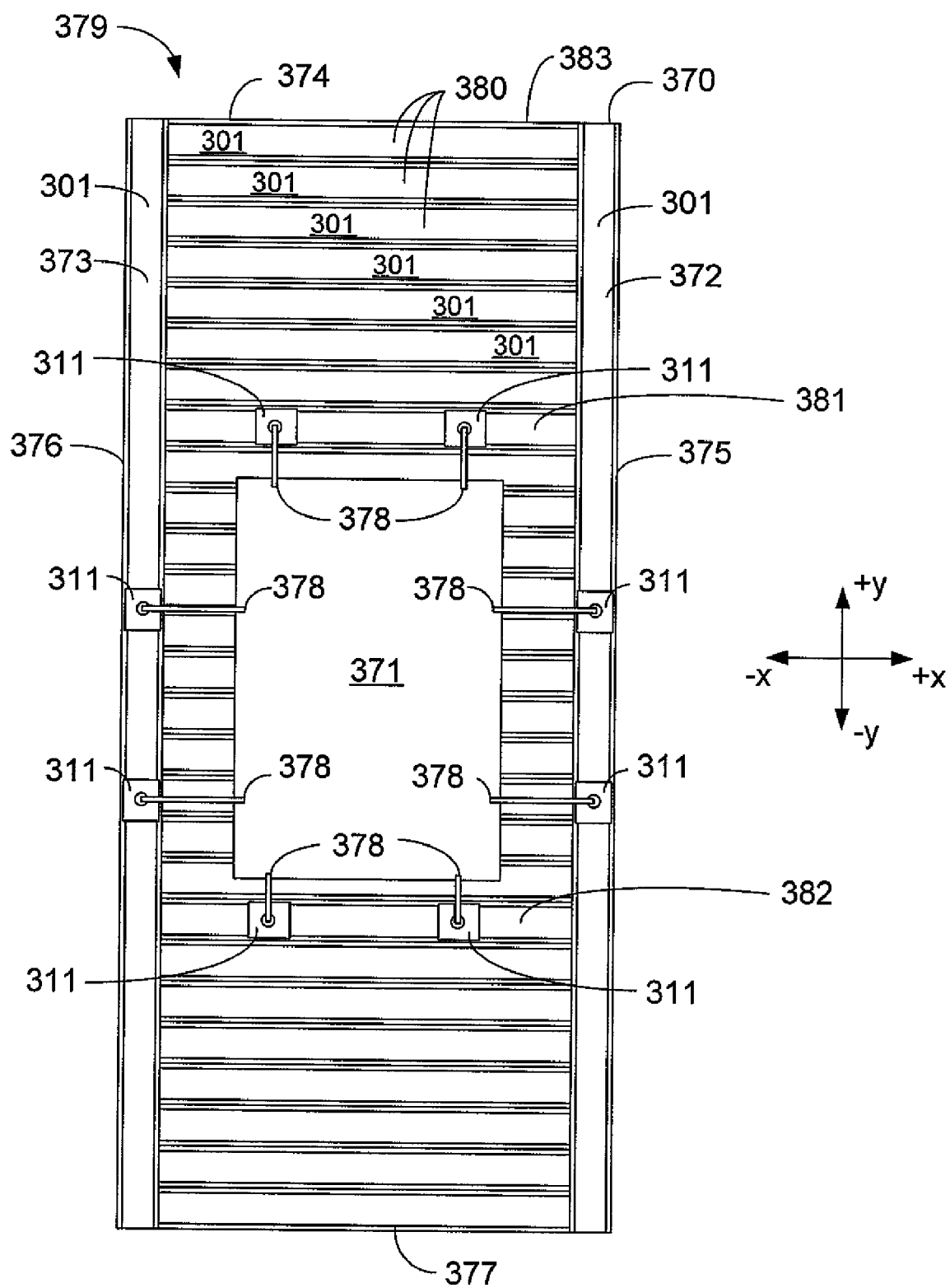
FIG. 11 is a top view of the trailer floor showing a load secured by a load securement system according to an embodiment of the present disclosure.

FIG. 11 illustrates a top view of a trailer floor 370 on a trailer 379. Note that with the configuration described herein, although the sliding brackets 311 may slide in a direction longitudinal to the floor panels 301 (in the + and −x direction) such that they are easily repositionable along the floor panels 301, the sliding brackets 311 may not move in a direction transverse to the floor panels 301. This provides a very secure load securement system when chains or straps 378 apply a force in the transverse direction, as illustrated in FIG. 11, which illustrates a top view of a trailer floor 370 on a trailer 379. The trailer floor 370 comprises a front side 364, a rear side 377, a right side 375, and a left side 376. The trailer floor 370 comprises a plurality of floor panels 301 arranged with a right side floor panel 372 running longitudinally down the length of the right side of the trailer 379 (i.e., in the + and −y direction); a left side floor panel 373 running longitudinally down the length of the left side of the trailer 379; and a central portion 383 comprising plurality of transverse floor panels 380 positioned generally perpendicularly to the right and left side floor panels 372 and 373. (Floor panels 380 are simply floor panels 301 positioned transversely as illustrated.)

All of the floor panels 372, 373, and 380 may comprises floor panels 301 of the type described herein. Therefore, sliding brackets 311 may be positioned in virtually any location on the trailer floor 370, and may thus secure a load 371 of virtually any size and shape. In order to secure the load 371 from movement in the direction of the trailer's longitudinal axis (i.e., the + and −y direction), the load 371 may secured to the sliding brackets 311 on transverse floor panels 381 and 382, as illustrated in FIG. 11. In order to secure the load 371 from movement in the transverse direction (i.e., the + and −x direction), the load 371 may be secured to the sliding brackets 311 on right and left side floor panels 372 and 373, as illustrated in FIG. 11.

This invention may be provided in other specific forms and embodiments without departing from the essential characteristics as described herein. The embodiment described is to be considered in all aspects as illustrative only and not restrictive in any manner.

As described above and shown in the associated drawings and exhibits, the present invention comprises a trailer load securement system. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A trailer load securement system comprising:
a trailer floor engageable with a load, the trailer floor comprising a plurality of floor panels, the plurality of floor panels comprising a plurality of tubular portions, the plurality of tubular portions comprising an upper wall comprising at least one pair of parallel channels for slideably receiving at least one sliding bracket for securing the load, wherein each pair of parallel channels comprises two channels and each sliding bracket extends between and is slideably received by the two channels.

2. The trailer load securement system of claim 1, wherein at least one of the plurality of floor panels extends longitudinally down a first side of the trailer floor, and at least one of the plurality of floor panels extends longitudinally down a second side of the trailer floor.

3. The trailer load securement system of claim 2, wherein at least one pair of sliding brackets secures the load with at least one sliding bracket slideably engaged with the first side trailer floor panel and at least one sliding bracket slideably engaged with the second side trailer floor panel.

4. The trailer load securement system of claim 1, wherein each channel comprises a protrusion extending into the channel and the sliding bracket comprises a pair of hook portions for slideably engaging with the protrusions.

5. The trailer load securement system of claim 4, wherein the pair of hook portions comprises two C-shaped concavities.

6. The trailer load securement system of claim 1, wherein each floor panel comprises at least two raised tracks.

7. The trailer load securement system of claim 6, wherein the raised tracks are serrated.

8. The trailer load securement system of claim 1, wherein the sliding bracket comprises a chain for securing the load.

9. The trailer load securement system of claim 8, wherein the chain is removeably fixed to the sliding bracket.

10. The trailer load securement system of claim 9, wherein the sliding bracket comprises a body, the body comprising an open central portion for receiving a washer and a cross bar.

11. The trailer load securement system of claim 10, wherein the body comprises an access opening for providing access to the open central portion of the bracket.

12. The trailer load securement system of claim 11, wherein the body comprises a top opening for receiving the chain.

13. A trailer load securement system comprising a trailer floor engageable with a load, the trailer floor comprising a plurality of floor panels, the plurality of floor panels comprising a plurality of tubular portions, the plurality of tubular portions comprising an upper wall comprising at least one pair of parallel channels for slideably receiving at least one sliding bracket for securing the load, wherein at least one of the plurality of floor panels extends longitudinally down a first side of the trailer floor, and at least one of the plurality of floor panels extends longitudinally down a second side of the trailer floor, and wherein one or more of the panels extend transversely between the first and second side trailer floor panels.

14. The trailer load securement system of claim 13, wherein at least one pair of sliding brackets secures the load with at least one sliding bracket slideably engaged with a first transversely extending floor panel on a forward side of the load and at least one sliding bracket slideably engaged with a second transversely extending floor panel on a rearward side of the load.

15. A trailer load securement system comprising a trailer floor engageable with a load, the trailer floor comprising a plurality of floor panels, the plurality of floor panels comprising a plurality of tubular portions, the plurality of tubular portions comprising an upper wall comprising at least one pair of parallel channels for slideably receiving at least one sliding bracket for securing the load, wherein at least one of the plurality of floor panels extends longitudinally down a first side of the trailer floor, and at least one of the plurality of floor panels extends longitudinally down a second side of the trailer floor, wherein each floor panel comprises at least two raised tracks, and wherein the sliding bracket slideably engages with the raised tracks.

* * * * *